United States Patent
Tran

[19]

[11] Patent Number: 5,892,462
[45] Date of Patent: Apr. 6, 1999

[54] ADAPTIVE GROUND COLLISION AVOIDANCE SYSTEM

[75] Inventor: My Tran, Albuquerque, N. Mex.

[73] Assignee: Honeywell Inc., Minneapolis, Minn.

[21] Appl. No.: 880,062

[22] Filed: Jun. 20, 1997

Related U.S. Application Data

[63] Continuation of Ser. No. 493,225, Jun. 20, 1995, abandoned.

[51] Int. Cl.⁶ .................................................. G08G 5/04
[52] U.S. Cl. ........................... 340/961; 340/970; 342/29; 701/301
[58] Field of Search .................................. 340/945, 961, 340/988, 968, 980, 963, 970, 995; 364/424.06, 429, 439, 441, 461, 462, 449.1, 460, 454; 342/29, 36, 453, 65; 701/3, 4, 9, 14, 18, 301

[56] References Cited

U.S. PATENT DOCUMENTS

| | | | |
|---|---|---|---|
| 3,668,403 | 6/1972 | Meilander | 364/440 |
| 4,646,244 | 2/1987 | Bateman et al. | 364/461 |
| 4,675,823 | 6/1987 | Noland | 364/460 |
| 4,796,190 | 1/1989 | Cummings | 364/449 |
| 4,862,373 | 8/1989 | Meng | 364/461 |
| 4,924,401 | 5/1990 | Bice et al. | |
| 5,086,396 | 2/1992 | Waruszewski, Jr. | 364/454 |
| 5,136,512 | 8/1992 | Le Borne | |
| 5,187,478 | 2/1993 | Grove | 340/970 |
| 5,414,631 | 5/1995 | Denoize et al. | 364/461 |
| 5,442,556 | 8/1995 | Boyes et al. | 364/461 |
| 5,448,233 | 9/1995 | Saban et al. | 340/961 |
| 5,488,563 | 1/1996 | Chazelle et al. | 364/461 |
| 5,631,640 | 5/1997 | Deis et al. | 340/961 |

FOREIGN PATENT DOCUMENTS

| | | | |
|---|---|---|---|
| A0609162 | 8/1993 | European Pat. Off. | G01S 17/88 |
| A0565399 | 10/1993 | European Pat. Off. | G05D 1/06 |
| A0597760 | 5/1994 | European Pat. Off. | G01C 21/00 |
| 4327706 | 8/1993 | Germany | G08G 5/04 |

*Primary Examiner*—Brent A. Swarthout
*Attorney, Agent, or Firm*—Andrew A. Abeyta; Kenneth J. Johnson

[57] ABSTRACT

A ground collision avoidance system that exhibits improved accuracy and performance by integrating with all other aircraft systems including guidance systems, navigation systems, digital terrain elevation databases, mission computers, and radar altimeters. The ground collision avoidance system fully utilizes active onboard sensors in combination with the knowledge of terrain and obstacle data contained in databases. Furthermore, the ground collision avoidance system provides a multiple processing path to determine numerous predicted flight paths based on a number of reasonable assumptions regarding the aircraft flight during a predetermined amount of time. By using predictive flight path schemes a realistic estimate of the predicted flight path envelope can be determined and then this information can be used in conjunction with accurate terrain elevation databases to determine whether a ground collision condition exists. On the basis of these calculations, appropriate warnings can be provided to the air crew as well as suggested maneuvers to avoid ground collision.

22 Claims, 15 Drawing Sheets

ADAPTIVE GROUND COLLISION AVOIDANCE SYSTEM

CROSS REFERENCE TO RELATED APPLICATIONS

This application is a continuation, of application Ser. No. 08/493,225, filed Jun. 20, 1995, abandoned.

BACKGROUND OF THE INVENTION

The present invention relates generally to ground collision avoidance system. More specifically, the present invention relates to an adaptive (e.g., scaleable and autonomous regardless of the aircraft type) ground collision avoidance system utilizing numerous sensors and cross checks to provide an accurate ground collision warning while at the same time avoiding unnecessary nuisance warnings.

As is well known in the aviation fields, avoiding controlled flight into the ground or ground collision is a very important endeavor. Every year many lives are lost due to the collision between an aircraft and the ground. Many times ground collision is caused by the pilot having misinformation or becoming disorientated and flying directly into the ground. Furthermore, ground collision is a problem for both military and commercial aircraft alike. Therefore, to promote the safety of air travel, systems that avoid collision with the ground are highly desirable.

In the past numerous systems have been developed to provide such ground collision avoidance. One type of system utilizes aircraft sensors to determine the proximity of the aircraft to the ground. These sensors can include barometric altimeters, radar altimeters, and forward looking infrared radar. While such equipment does provide a warning of the possibility of collision with the ground, these systems are highly limited by the capabilities of the sensors themselves.

A second type of system utilizes a predetermined minimum safe altitude for given region in which the aircraft is traveling. Consequently, if the aircraft travels below this predetermined minimum safe altitude, then a warning indicates to the pilots that they are in danger of ground collision. This system is fine for providing general warnings in a flat terrain environment. However, in certain situations, such as fighter aircraft performing terrain following missions, when an aircraft is required to travel at low altitudes above the ground this system is impractical. This is especially true in geographic regions having large variations in elevation.

Another system for providing ground collision avoidance warnings is one wherein the flight dynamics of an aircraft are constantly monitored to provide an indication of possible collision. More specifically, the altitude loss is monitored during numerous maneuvers and is subsequently interpolated to determine whether ground collision is imminent. This type of system, however, is incapable of predicting the true ground situation and the maneuvering controls or considering maneuvering alternatives available to the pilot. It is well known that while in a dive typically a pilot will eventually pull out. If altitude loss interpolation is carried out at this point then a false warning or nuisance warning will surely sound. For this reason this type of system is also impractical.

One overriding consideration when designing a ground collision avoidance system is the avoidance of constant false warnings or nuisance warnings. Systems can be devised having differing sensitivities and differing warning methodology. However, these systems are of no use to a pilot if they provide continuous nuisance warnings suggesting that the pilot is in imminent danger of ground collision, when in reality the pilot is flying in a safe condition. If too many nuisance warnings are provided, the ground collision avoidance system will likely be disabled and at that point become totally useless. For this reason it is desirable to provide a very realistic system capable of providing ground collision avoidance warnings only at a point when they are likely to be meaningful and heeded by the flight crew.

SUMMARY OF THE INVENTION

The present invention provides an integrated system that utilizes all available on board sensors and systems to generate accurate ground collision avoidance warnings. Some of the presently available on board aircraft systems include, for example, inertial reference or inertial navigation systems, global positioning systems (GPS), radar altimeters, air data sensors, mission computers, flight control computers, multi-function displays, digital map systems, active terrain sensors, terrain reference navigation systems, and heads up displays (HUD). By utilizing the information provided by all of these systems an accurate ground collision avoidance warning can be produced without adding considerable amounts of hardware to an aircraft.

The present invention is an adaptive ground collision avoidance system that employs a continuously-updated digital terrain elevation database in order to provide an accurate analysis of the terrain over which an aircraft is flying. This local terrain awareness system incorporates a digital terrain elevation database along with inputs from active terrain sensors, radar altimeter, as well as the inertial navigation system. The combination of these elements provides an accurate depiction of the terrain directly under and along the flight path of the aircraft. Because the database is continually updated by the radar altimeter and other active sensors, the accuracy of the database is not of a concern because it is continually augmented. By augmenting the information already contained in the database, a more accurate picture over a large area of the terrain over which the aircraft is flying can be generated. The accuracy of the terrain model does not change as the aircraft moves away or closer to the aircraft, because the model is continuously updated due to the inputs of the active sensors. Additionally, the database is able to account for newly-erected structures on the ground, which may have been erected since the database was constructed. The ground collision avoidance system provides numerous predicted flight paths for the aircraft based on a reasonable number of assumptions regarding the aircraft flight during a predetermined amount of time. Initially, a first flight path is determined for the aircraft as it flies along its current route. A second/recommended route is calculated for the aircraft that would allow the aircraft to avoid any obstacle along the first path with which the aircraft would otherwise collide. Instead of the ground collision avoidance detector being a mere proximity detector to terrain which can be collided with, it instead allows the aircraft to realize that it has an exit route, and the collision warning notification is then not given until the absolute last minute. The recommended route is provided to the pilot as an automatic guidance feature. As soon as it is determined that the escape route is to disappear, the ground collision warning is then made and a proposed course of escape is provided to the pilot.

The system of the present invention provides a ground collision avoidance system which is scaleable or modifiable based on the specific configuration of the aircraft platform being utilized or the mission being flown. This scaling capability allows the system to be tailored to the present aircraft capabilities. Consequently, this system is much more accurate and adaptive. Examples of such tailoring include setting response times and aircraft aerodynamic design thresholds according to high performance fighter aircraft as opposed to air transport type aircraft.

In producing an accurate ground collision avoidance warning the present system correlates and blends all available information regarding localized terrain and obstacles to create a very accurate image of the terrain situation over which the aircraft is operating. Also the present system makes some basic assumptions to predict the most possible or probable flight paths that will be flown and maneuvered by the aircraft. These two sets of data can then be correlated, and the flight path can be mapped to the ground. These predicted flight paths can then be used in conjunction with projected ground pathways to determine whether ground collision condition is imminent and thus, if a warning is warranted. These possible flight envelopes are predicted and then utilized by the system to determine ground collision conditions. Such flight envelope mapping or ground mapping after corrected for terrain variances allows for very reliable and accurate assessments of collision conditions. Additionally, the present system presents a flight re-planning procedure when the system determines that a ground collision situation exists.

Once a ground collision condition has been determined the present system provides further guidance and control to avoid this possible ground collision situation. This avoidance control can provide for both pitch and roll commands while also providing thrust commands to guide the aircraft to a target with a clearance altitude so as to avoid collision.

In conjunction with all the previous capabilities the system of the present invention provides both visual and concise audio warnings to the air crew. Visual warnings can be provided via the multifunction displays, a dedicated ground collision display or heads up displays. Audible warnings can be provided via speakers and/or buzzers within the cockpit. The display warnings can be configured to provide a number of different levels of warning conditions to the air crew including warning of collision possibilities to imminent collision conditions.

It is an object of the present invention to provide meaningful, useful, and accurate ground collision warnings to any air crew operating an aircraft. These warnings are of no use if the ground collision avoidance system provides numerous unwarranted warnings thus causing them to be classified as false alarms or nuisance warnings.

It is also an object of the present invention to provide a ground collision warning system that integrates all capabilities existing within an aircraft. This is accomplished by utilizing the outputs provided by other systems such as mission computer, navigation systems, flight control computer systems, digital map systems, etc.

It is a further object to the present invention to provide a ground collision warning system that can be tailored for each particular aircraft application and each mission flown. More specifically, it is an object of the invention to provide a system that can be altered to match the performance characteristics of the aircraft within which the system is operating. Such tailoring or scaleability causes the ground collision warning system to be much more accurate because the system can accurately predict the maneuvering capabilities of the aircraft.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

Further objects and advantages of the present invention can be seen by reading the following detailed description in conjunction with the drawings in which.

DETAILED DESCRIPTION OF THE INVENTION

Figure 1:
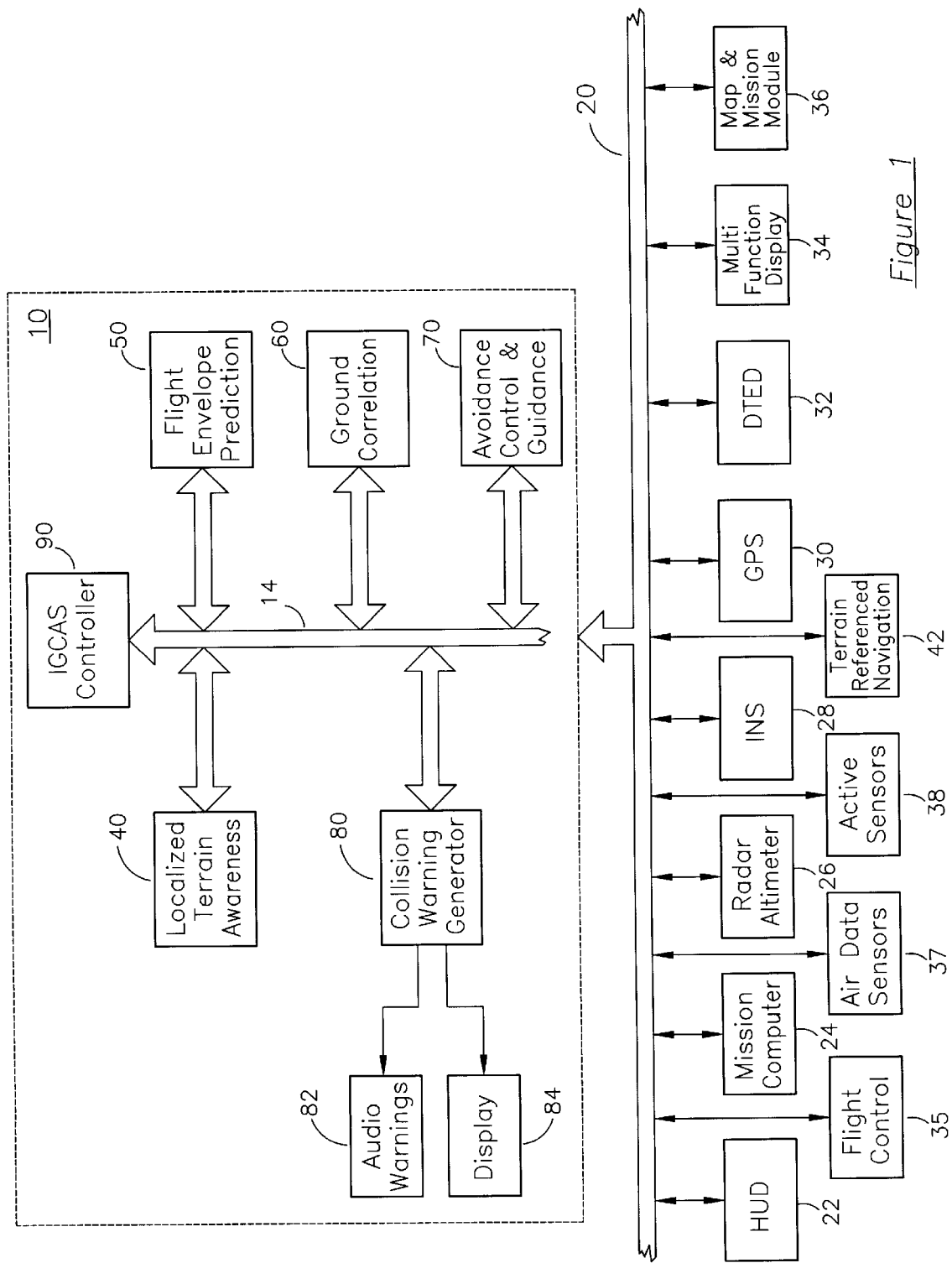
FIG. 1 is a block diagram of the integrated ground collision avoidance system controller and its relationship to numerous other aircraft systems.

Referring to FIG. 1, there is shown a block diagram of the integrated ground collision avoidance system 10 along with a number of other typical aircraft systems. Generally, an aircraft contains a number of avionics systems connected to some kind of avionics bus 20. In conjunction with the integrated ground collision avoidance system 10 (IGCAS 10), FIG. 1 shows a heads up display (HUD) 22, a mission computer 24, a radar altimeter system 26, an inertial navigation system (INS) 28, a global positioning system 30 (GPS), digital terrain elevation database (DTED) 3, a multi-function display 34, a flight control computer 35, a map and mission module 36, air data sensors 37, active terrain sensors 38, and a terrain referenced navigation system 42. While these systems are exemplary of those attached to a typical avionics bus 20 it will be understood that numerous other systems can be and typically are connected. Avionics bus 20 allows all of these systems to share information and communicate with one another. Typical examples of avionics bus 20 are a MIL STD-1553 bus used in most military applications an, an ARINC bus used in commercial applications.

Integrated ground collision avoidance system 10 contains a number of components each of which provides a specific capability. While each of these components has dedicated purposes it will be recognized that they continue to communicate with one another and share information at all times. Included within integrated ground collision avoidance systems 10 is a localized terrain awareness system 40, a flight envelope prediction system 50, a ground correlation system 60, an avoidance control and guidance system 70, and a collision warning generator 80.

Localized terrain awareness system 40 coordinates the numerous sensors and systems on the aircraft that deal with terrain elevation sensing. Localized terrain awareness system 40 then correlates and overlays these data to build a complete image of the terrain and feature situation over which the aircraft is operating.

Flight envelope prediction system 50 coordinates with the flight control computers 35, mission computer 24 and the inertial navigation systems 28 to provide one or more predicted flight envelopes within which the aircraft will be traveling during a predetermined period. Flight envelope prediction system 50 calculates a number of reasonable flight envelopes based on the extended current flight trajectory and the possible maneuvers that a pilot is likely to carry out. Flight envelope prediction system 50 also operates with the high fidelity aircraft model 39 (including flight control and guidance models) to accurately predict the possible maneuvering capabilities of the aircraft. In this way the flight envelope prediction system 50 can be modified for different types of aircraft thus allowing a more accurate prediction of aircraft maneuverability.

Ground correlation system 60 utilizes the information provided by localized terrain awareness system 40 and flight envelope prediction system 50 to ground map the aircraft's flight. This ground mapping is accomplished by projecting the possible flight paths upon the correlated terrain and feature image over which the aircraft is flying. From this ground correlation a warning situation can be detected wherein it is determined that ground collision is imminent if no further corrective action is taken.

Avoidance control and guidance system 70 utilizes the information from the previously mentioned systems and determines the appropriate maneuvering action to avoid imminent collision. Avoidance control and guidance system 70 then can provide the pilot or air crew with appropriate "fly out" commands to avoid ground collision.

Figure 2:
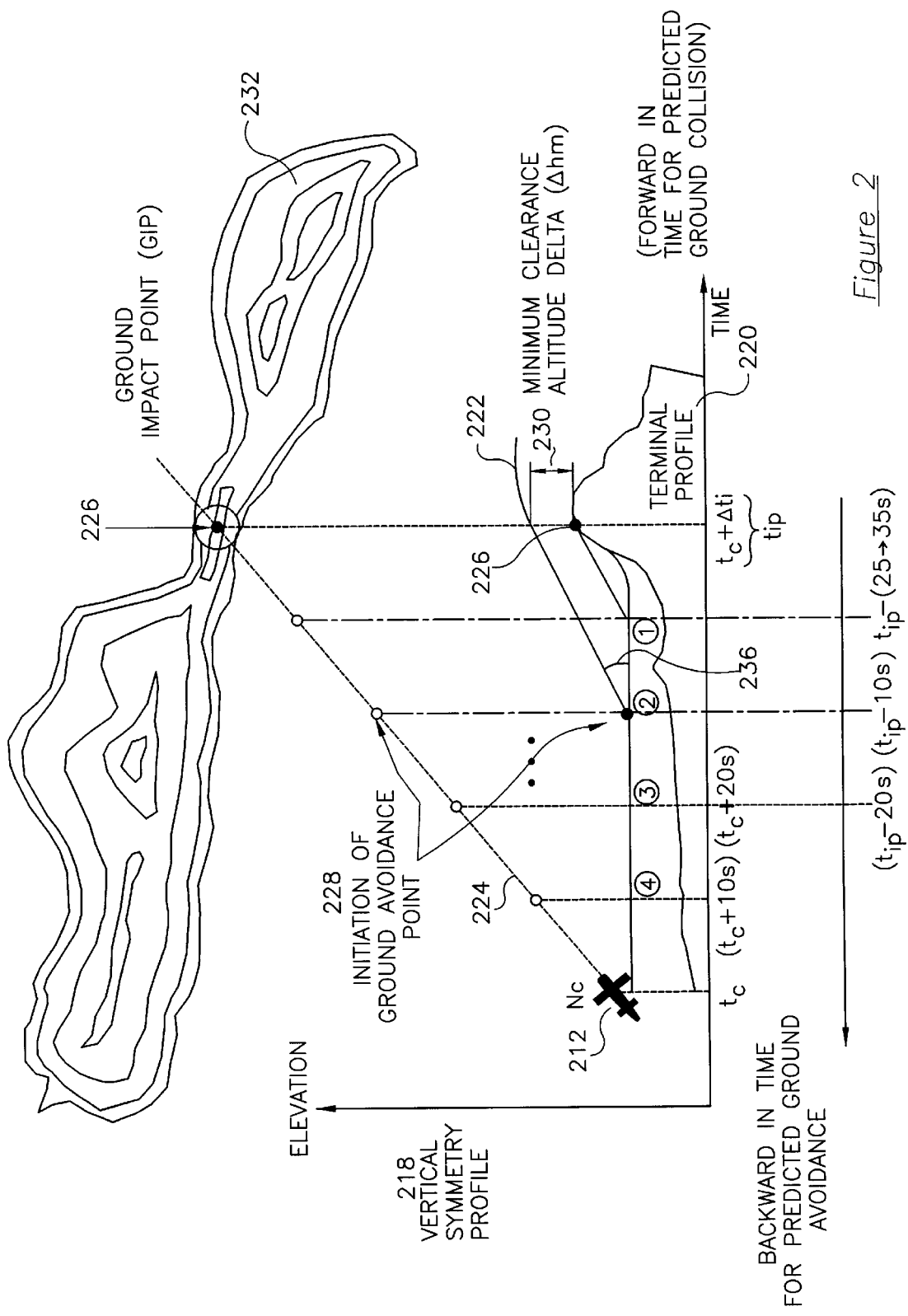
FIG. 2 is a vertical scanning profile (elevation versus time) of an exemplary geographical area over which an aircraft is operating in a straight flight path.
Figure 5:
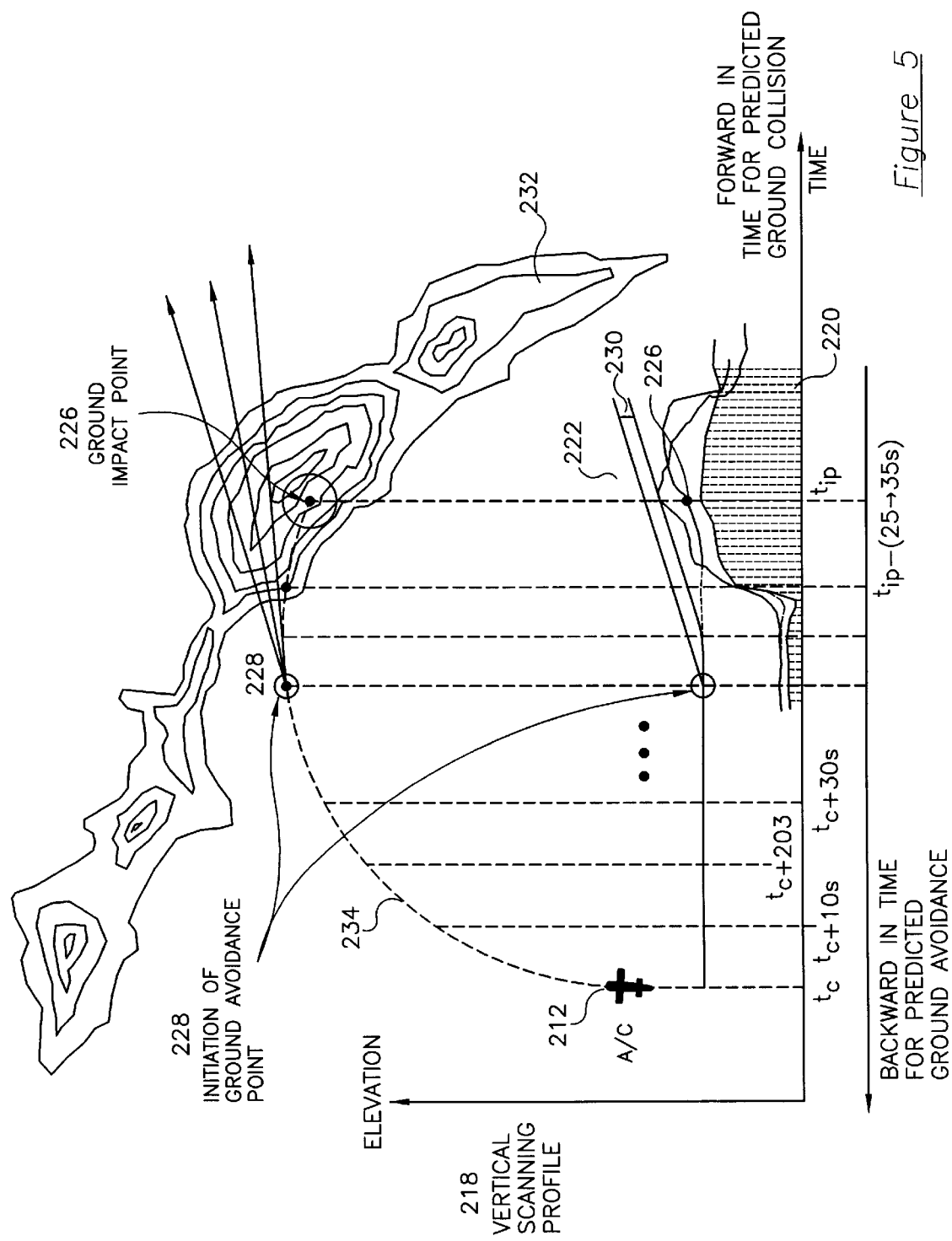
FIG. 5 is a vertical scanning profile (elevation versus time) of an exemplary geographical area over which an aircraft is operating in a curved flight path.

Lastly, ground collision warning generator 80 provides the necessary warnings and displays to the pilot and air crew to alert them to possible ground collision and provides them with the visualized vertical terrain profile and, predicted flight path, and highlighted collision point (see FIGS. 2 and 5 for ground collision point as represented on the terrain scanning profile). Ground collision warning generator 80 has attached thereto audio warnings system 82 and a ground collision warning display 84. Audio warnings system 82 provides audible warnings to the pilot such as buzzers or possible "fly out" cueing commands. The buzzers can be variable frequency tone and distinctive voice advisories and warnings for various/different ground proximity, ground collision, and ground avoidance situations. Similarly, ground collision warning display 84 can display the possible collision situations to the pilot as well as display the necessary evasive maneuvers to assist the pilot in avoiding ground collision.

Referring to FIG. 2, there is shown a vertical scanning profile 218 of aircraft 212 following a straight flight path 224 (top view of the aircraft's flight path) with elevation versus time. The upper portion of FIG. 2 represents a top, elevation view of the terrain 232 that aircraft 212 is approaching, while the bottom portion of FIG. 2 represents a corresponding vertical scanning profile 218 of aircraft 212's vertical flight path 222 and the terrain profile 220 that aircraft 212 is approaching. In FIG. 2, $t_c$ represents the current time, and $t_{ip}$ represents the time of impact (corresponding to ground impact point 226) unless ground avoidance maneuvers are employed. The $t_{ip}$ is the $t_c$ combined with the continuously-updated change in $t_{ip}$ ($\Delta t_{ip}$) based on the ever-changing aircraft parameters, such as position, altitude, and terrain convergence. The minimum clearance altitude delta 230 represents the minimum acceptable distance between the ground impact point 226 and aircraft's vertical flight path 222 that will allow aircraft 212 to avoid collision with the terrain. In practice, the minimum clearance altitude delta 230 is initially set at a preselected value, which, if desirable, can be increased at the discretion of the pilot and/or flight crew based on their mission and level of comfort. The ground impact point 226 is determined by predicting or calculating forward in time the instantaneous positions and inertial vector status from the aircraft's current position, based on the aircraft parameters, to determine the location and time of impact with the terrain. DTED 32 and model 39 are used in calculating/simulating ground impact point 226.

Figure 3:
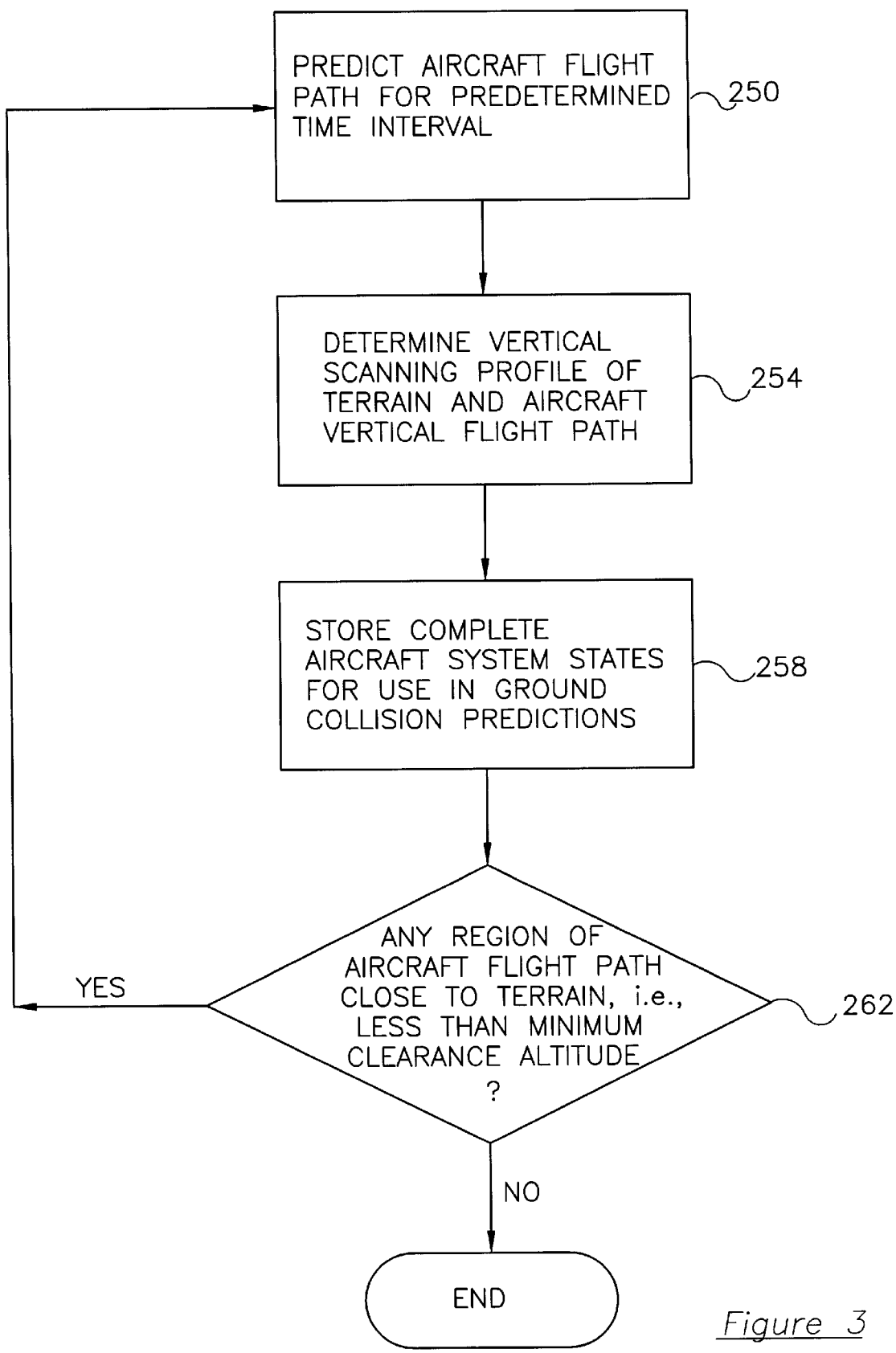
FIG. 3 is a logic flow diagram outlining the predicted ground collision process followed by ground collision avoidance system 10 to obtain a predicted ground collision situation.
Figure 4:
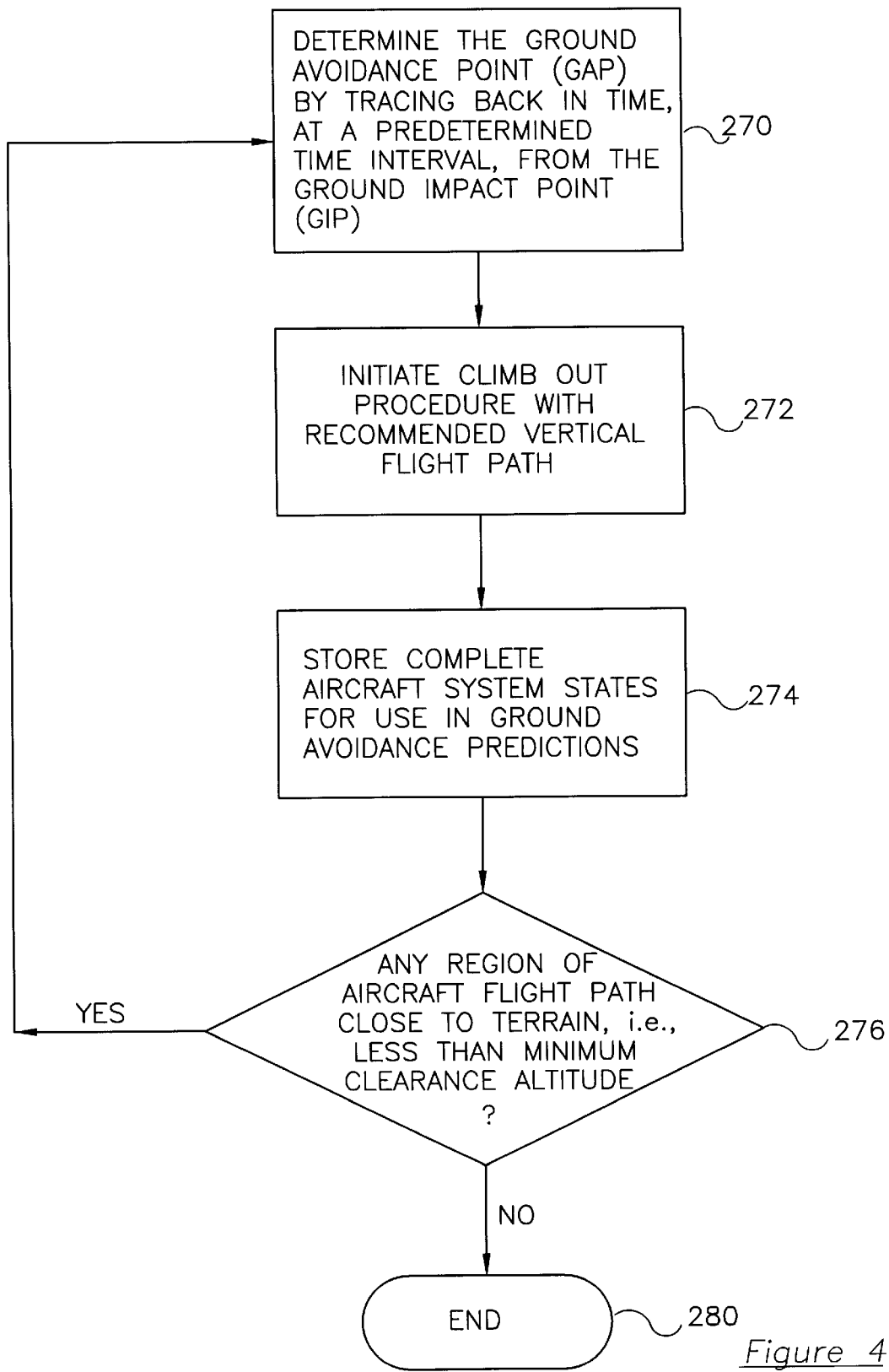
FIG. 4 is a logic flow diagram outlining the predicted ground avoidance process followed by ground collision avoidance system 10 to obtain a predicted ground avoidance situation.

The present invention simultaneously employs a predicted ground collision procedure as shown in FIG. 3 and a predicted ground avoidance procedure as shown in FIG. 4. (For example, the functions of predicted ground collision and predicted ground avoidance are assigned to parallel processors in ground collision avoidance system 10 for simultaneous processing.) Referring to FIG. 3, there is shown the predicted ground collision procedure employed by the present invention. In block 250, ICGAS 10 is employed to predict the aircraft flight path 224 for a predetermined amount of time into the future, e.g., three minutes in advance. In practice, the system predicts the aircraft flight path for three to five minutes into the future to obtain an accurate intermediate flight path. Other time intervals can be used depending upon the aircraft situation, which will become apparent to those skilled in the art. In block 254, the vertical scanning profile 218 (shown in FIGS. 2 and 5), including terrain profile 220 and the aircraft's vertical flight path 222, is determined using the data contained in DTED 32. In block 258, the complete simulated aircraft inertial states are stored for later retrieval as necessary for use in subsequent flight path predictions. The stored aircraft dynamic state vectors include the aircraft's position, heading, speed, altitude, altitude rate, attitude, attitude rate, and acceleration in, for example, ten second increments as shown in FIG. 2 ($t_c$, $t_c$+10 sec, $t_c$+20 sec, etc.). In block 262, it is determined whether any region of the aircraft's flight path is in close proximity to the terrain, which is determined based on any value, the difference between the simulated flight path and the vertical profile of the terrain, that is less than the predetermined minimum clearance altitude 230 (the minimum clearance altitude is selected in advance).

Referring to FIG. 4, there is shown the predicted ground avoidance procedure employed by the present invention. In block 270, ICGAS 10 is employed to determine the initiation of ground avoidance point (GAP) 228 by selecting the aircraft state vector at a predetermined time interval, i.e., by tracing back in time from ground impact point 226 for a predetermined time interval (i.e., $t_{ip}$ minus predetermined time interval). The GAP 228 is the recommended point along the flight path 222 at which the aircraft should begin climbing out or up. In practice, for example, the time interval can be from about 25 to 30 seconds. The present invention can also provide a means for advising the pilot and/or flight crew when the minimum clearance altitude delta has been achieved and the aircraft can begin to level off. Additionally, the present invention can also continuously monitor the initiation of the GAP 228 for subsequent use.

Referring again to FIG. 2, GAP 228 is used to indicate to the pilot that a different flight path should be initiated at that point to achieve ground avoidance situation. In block 272, the system initiates a climb out procedure by displaying a recommended vertical flight path 222. In block 274, the terrain proximity conditions are evaluated. In block 274, the scaled down aircraft system states are stored for later retrieval as necessary for use in iteratively predicting and recommending the flight path 222. The stored aircraft dynamic inertial state vectors include the aircraft's position and altitude. This process is iteratively repeated until a clear flight path can be located. This process is repeated in, for example, ten second decrements as shown in FIG. 2 ($t_{ip}$, $t_{ip}$–25 sec, $t_{ip}$–35 sec, $t_{ip}$–45 sec, etc.). In block 276, a decision is made as to whether the minimum clearance altitude delta 230 is acceptable, i.e., whether any region of the aircraft's flight path is close to the terrain. If the minimum clearance altitude delta 230 is acceptable, which means the GAP 228 has been located, then the process is complete and moves on to termination in block 280. If the minimum clearance altitude delta 230 is not achievable (i.e., ground collision probable), then the process returns to block 270 for further processing. The process is iteratively repeated (blocks 270 through 276) at, for example, ten second intervals to re-evaluate, and re-calculate if necessary, the vertical scanning profile. The re-evaluation includes repeating steps 270 through 276 at a predetermined time interval (e.g., ten second decrements from $t_{ip}$–25 sec.) until a clearance of terrain situation is located. If the minimum clearance altitude delta 230 is not acceptable, and a clearance of terrain situation cannot be located, then a simulated aircraft flight re-planning procedure, or evasive maneuver, is initiated and displayed, which enables the pilot and flight crew to roll, roll-out and climb-out and avoid the ground. This re-evaluation and flight re-planning process employed is discussed in more detail below with reference to FIGS. 12 and 13.

Referring to FIG. 5, there is shown a vertical scanning profile of an aircraft following a curved flight path 234. The upper portion of FIG. 5 represents a top, elevation view 232 of the terrain that aircraft 212 is approaching, while the bottom portion of FIG. 5 represents a corresponding vertical scanning profile 218 of aircraft 212's vertical flight path and the terrain profile 220 that aircraft 212 is approaching. The same discussion with respect to FIGS. 2 and 4 above applies to the use of FIG. 5 with the exception that the aircraft 212 is following a curved flight path 234 as opposed to the straight flight path 224 in FIG. 2. For backward-in-time tracing to predict ground avoidance, the aircraft will be performed with roll-out and then climb-out. The terrain profile corresponding with its roll-out and climb segments will be evaluated for ground clearance.

Figure 6:
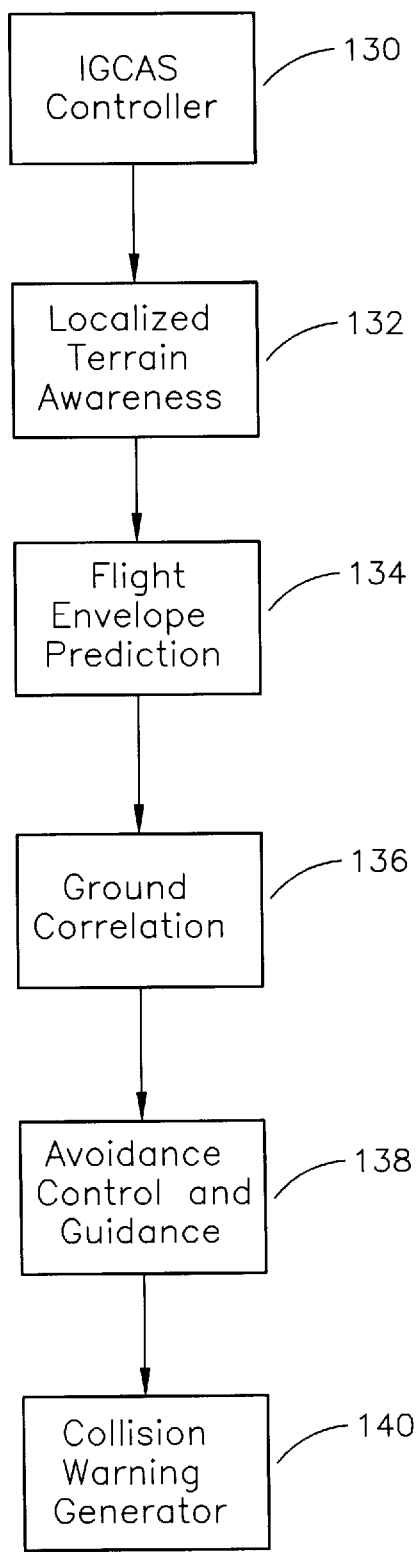
FIG. 6 is a logic flow diagram outlining the process followed by the integrated ground collision avoidance system controller.

Referring to FIG. 6, there is shown a more detailed diagram of the flow logic followed by integrated ground collision avoidance controller 90. The IGCAS controller 90 starts the process by initializing and setting up system capabilities in the collision system in block 130. The system then moves on to localize terrain awareness in block 132. This process involves a complete evaluation of the terrain over which the aircraft is operating. Further elaboration of the localized terrain awareness 132 is found later in the present specification in relation to the discussion of FIGS. 3 and 4. The system then moves on to the prediction of probable flight envelopes in block 134. Flight envelope prediction block 134 calculates the possible flight trajectories based upon the current dynamic state of the aircraft, dynamics constraints (e.g., roll limit, roll rate limit, pitch limit, pitch rate limit, thrust limit, etc.), and the probable aircraft recovery maneuvers. Again, further elaboration on the process followed by the flight prediction envelope block 134 is present specification in relation to the discussion of FIGS. 9 and 10. The process then moves on to ground correlation block 136 wherein the predicted flight envelopes are correlated with ground data. This involves retrieving elevation and feature data corresponding to the aforementioned flight envelopes. From this retrieved data and the resulting correlation, the system can determine if a high probability of a collision condition exists. This process is further discussed in relation to FIGS. 11 and 12. The process then moves on to calculate avoidance control and guidance commands in block 138 wherein collaboration with blocks 134 and 136 to determine ground and terrain avoidance flight path and based on this collaboration, commands are generated which can then be sent to the aircraft's flight control system to avoid a collision. Further, the commands can be provided to the multi-function display 34 to generate flight director commands and to heads up display 22 to generate avoidance pathway in the sky. These avoidance commands are based upon the predicted ground and avoidance flight path and the dynamic and performance capabilities of the aircraft. Further discussion of this process is contained in the present specification in relation to FIGS. 14 and 15. Lastly, the present system generates appropriate warnings in collision warning generation block 140. These warnings indicate to the flight control system that ground collision is imminent unless indicated evasive action is taken. Concurrently, appropriate guidance commands are provided to the pilot (i.e. the avoidance control and guidance commands generated in block 138).

Figure 7:
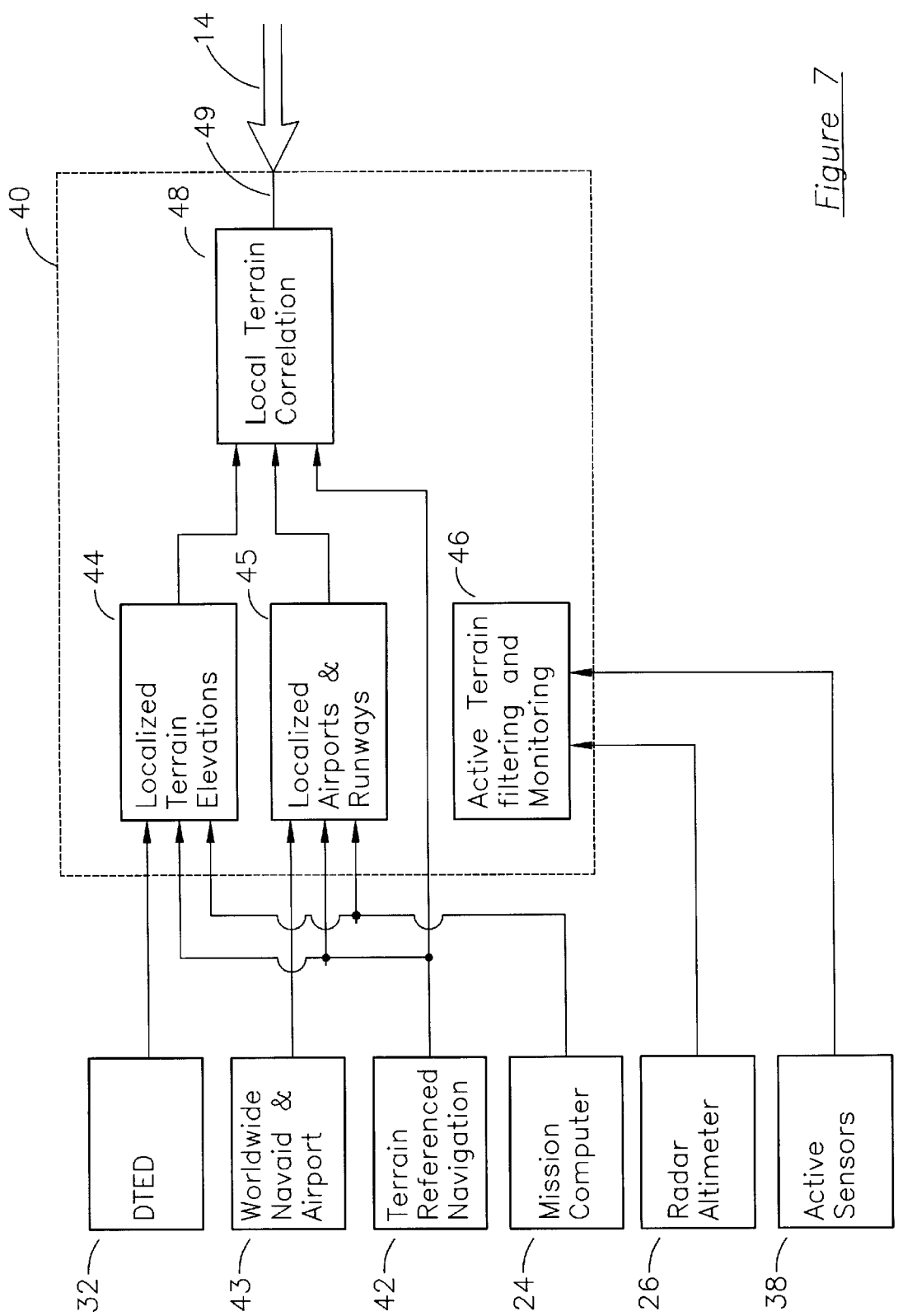
FIG. 7 is a block diagram illustrating the portions of the localized terrain awareness system.

Referring to FIG. 7, there is shown a block diagram illustrating the localized terrain awareness system 40. As previously discussed, localized terrain awareness system 40 relies on inputs from a number of different devices. These devices include the digital terrain elevation database 32, active terrain sensors 38, radar altimeter 26, mission computer 24, terrain reference navigation system 42, and worldwide navaid and airport indicator 43. These are the systems available to the localized terrain awareness system 40. All the numerous inputs are utilized by localized terrain awareness system 40 to build and fuse a complete vertical scanning profile of the geographical area over which the aircraft is operating (see, e.g., the vertical scanning profiles in FIGS.

2 and 5). This picture includes an accurate picture of the terrain elevation and the geographic formations over which the aircraft is presently flying or will be flying in the near future.

Localized terrain awareness system 40 contains a localized terrain elevation system 44 that receives inputs from digital terrain elevation database 32, terrain referenced navigation system 42, and mission computer 24. From these numerous inputs, the localized terrain elevation system 44 can determine where the aircraft is flying and the corresponding terrain for the area over which the aircraft is presently flying. Furthermore, localized terrain elevation system 44 can anticipate the next region over which the aircraft will be flying and provide elevation data for that region as well. Much of the elevation information is received from digital terrain elevation database 32. Digital terrain elevation database 32 contains elevation data and feature data (e.g., buildings, towers, etc.) for large geographical areas and manipulates this data overlaid with feature data to provide elevation data in manageable portions.

A localized airport and runway system 45 receives inputs from a worldwide navaid and airport data system 43, the terrain referenced navigation system 42, the flight control computer 35 and the mission computer 24. From these inputs the localized airport and runway mapping system 45 can determine exactly when the aircraft is in the vicinity of an airport and when the aircraft has begun to initiate its approach for a landing. Typically the worldwide navaid and airport data system 42 can include an ILS system, VOR system, or a glide slope verification system. This information is particularly relevant because numerous nuisance warnings can be avoided if the IGCAS 10 is aware that the aircraft is approaching the ground because it needs to land.

Localized terrain awareness system 40 also contains an active terrain monitoring system 46 that receives inputs from radar altimeter 26 and active terrain sensors 38. Active sensors 38 can include high-frequency scanning-ahead radar altimeters, laser range finders, infrared radar, or other well known proximity sensors. Active terrain monitoring system 46 receives these inputs and calculates a plurality of elevation information for the geographic region over which the aircraft is operating.

Output from localized terrain elevation system 44, the localized airport and runway system 45, and active terrain monitoring system 46 is provided to a local terrain correlation system 48. Also providing an input for terrain accuracy to local terrain correlation system 48 is terrain reference navigation system 42. Local terrain correlation system 48 then correlates all the altitude and terrain information received and provides an output that, in summary, provides a complete picture of terrain over which the aircraft is presently operating and the terrain over which the aircraft may soon be operating. This correlation is accomplished by comparing and then combining outputs from the active terrain monitoring system 46, localized airport and runway system 45, and localized terrain elevation system 44. Outputs from the terrain reference navigation system 42 are then used to enhance the fidelity of the local terrain correlation system 48 and provide a comprehensive view of the local terrain. This localized terrain data is then output on bus connection 49. While numerous inputs to localized terrain awareness system 40 are shown, it is understood that these inputs could be accomplished through numerous bus connections and other types of electronic communication. Furthermore, the outputs from localized terrain awareness system 40 are then available on the IGCAS bus 14.

Figure 8:
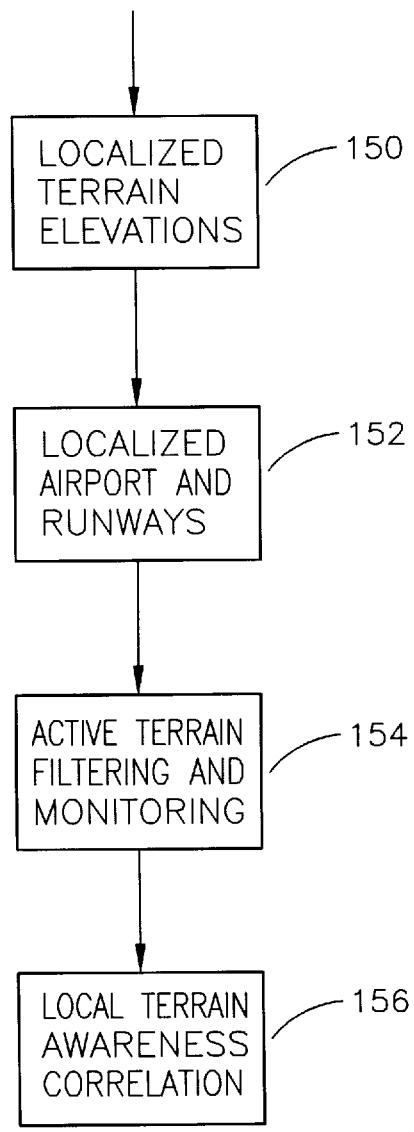
FIG. 8 is a logic flow diagram outlining the process followed by the localized terrain awareness system.

Referring to FIG. 8, there is shown a flow diagram illustrating the logic steps followed by localized terrain awareness system 40. Initially, the terrain elevation data and the flight dynamics data are monitored to localize the terrain elevations in block 150. Localization of the terrain elevation data simply involves the retrieval of elevation data corresponding to the area over which the aircraft is flying. Following the localization of terrain elevation data 150, airport and runway data is localized, and fusing where appropriate, in block 152. Similarly, this localization involves the retrieval of airport and runway data corresponding to the area over which the aircraft is operating. Localization of data relative to runways and airports will be relevant only during certain periods of aircraft operation, however, an indication of take-off or landing maneuvers is very essential if nuisance warnings are to be avoided. The process then performs active terrain filtering and monitoring in block 154. This activity provides a cross-check for fusing of the aforementioned terrain elevation localization (performed in block 150) and the runway and airport localization (performed in block 152). Lastly, all of the localized terrain information obtained (localized terrain elevation data, localized airport and runway data, and active terrain monitoring data) is correlated in block 156 so as to provide a complete vertical scanning profile of the local terrain over which the aircraft is operating.

Figure 9:
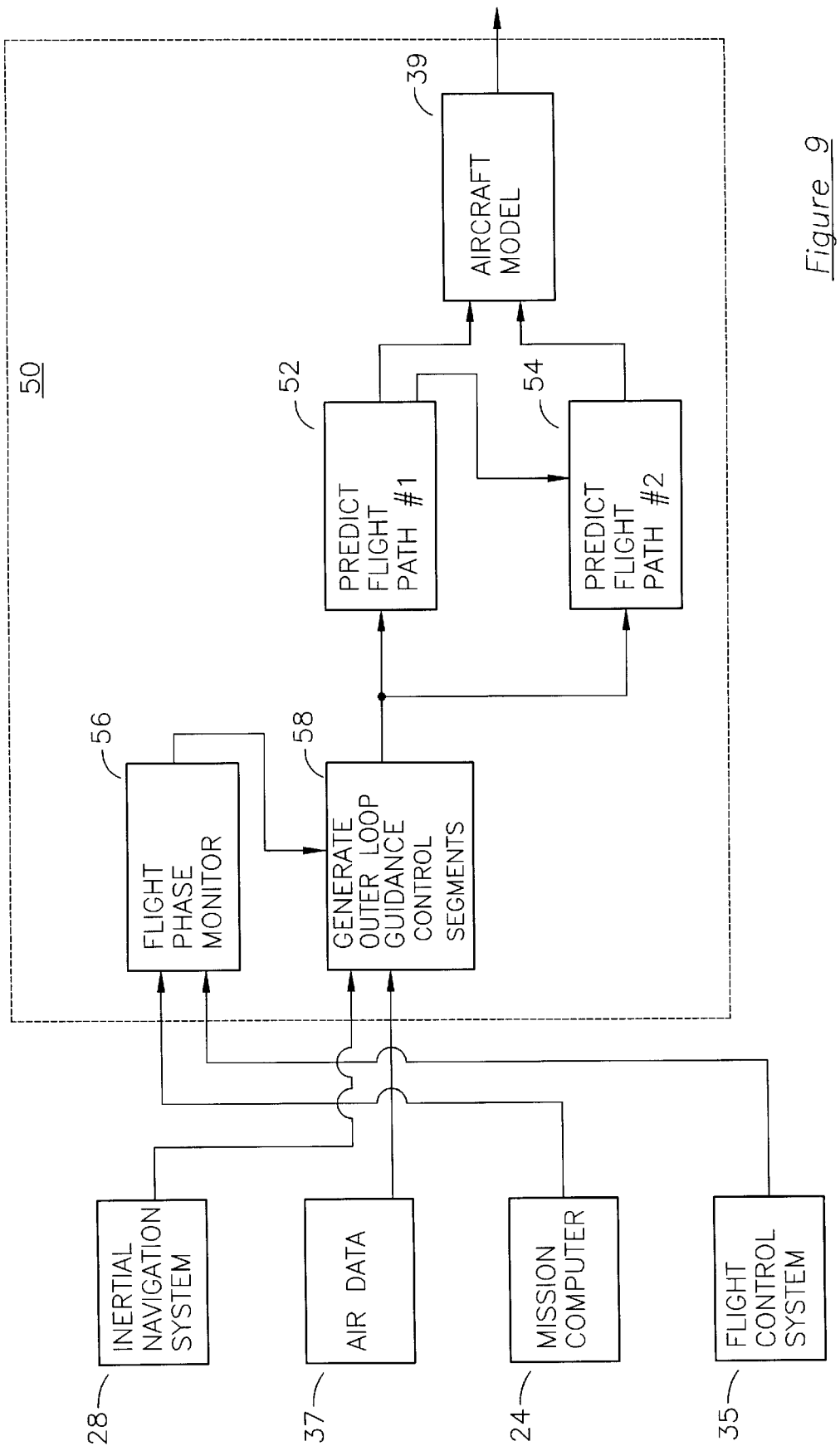
FIG. 9 is a block diagram illustrating the flight envelope prediction system.

Referring to FIG. 9, there is shown a more complete block diagram of flight envelope prediction system 50. Flight envelope prediction system 50 contains a flight phase monitor 56, an outer-loop guidance control generator 58, a first predicted flight path system 52 (forward-in-time ground collision situation), a second predicted flight path system 54 (backward-in-time ground avoidance situation), and an aircraft dynamics model 39, which is continuously updated as discussed earlier to utilize the recommended flight path (i.e., second flight path envelope) parameters. While the exemplary embodiment, in FIG. 9 shows two predicted flight path systems it will be understood that more of these types of systems could be incorporated as necessary.

After the first flight envelope is determined, which is the predicted flight path of the aircraft, including all known terrain features, a second flight envelope is then calculated. This second/recommended flight envelope is encompassed within the first flight envelope and provides a range in which the aircraft can perform a climb maneuver in order to avoid any collisions with the ground. This second flight envelope is not restricted to any predetermined distance in front of the aircraft, but instead takes into account all of the same criteria as the first flight envelope. In the generation of the second flight envelope, all potential collisions along the current flight path are provided to the pilot instead of making continuous calculations of possible climb paths until a terrain obstacle is detected. A second predicted flight envelope is recited, which is a flight path that is continually generated to provide a check if a ground collision is truly imminent. One purpose of this second flight envelope is to generate the sounding of the collision warning when it is determined that the aircraft is closely approaching ground avoidance point (GAP) 228 and increase the probability of no longer being able to climb out of its present course without colliding with the ground or other obstacle. When it is determined that the climb out path is no longer possible, audio and visual warnings are provided and an evasive maneuver based on flight path re-planning calculations are provided for the aircraft to follow in order to avoid the collision. Accordingly, it is possible to avoid most alarms, because if the aircraft is able to perform a simple climb out to avoid a collision, then a sounding of the alarm is unnecessary. The activation of the alarm is only sounded when the climb out has to be performed or an evasive maneuver has to be initiated and a collision is otherwise imminent.

One advantage of the present invention is that the pilot is always informed of a potential collision condition regardless of the distance of the obstacle in front of the aircraft; the present invention teaches the calculation of a potential collision condition using a terrain database (DTED 32) at a point where the potential collision could actually occur instead of the continuous recalculation of climb outs from a reference point in front of the aircraft.

Flight phase monitor 56 keeps track of exactly which phase of the flight the aircraft is in (e.g. takeoff, landing, level flight, high maneuverability, transition climb out, transition roll-in, transition roll-out, descent, low altitude air drop, dive, recovery from dive, . . ). The particular phase of a flight will seriously affect the assumptions that a first predicted flight path system 52 and a second predicted flight path system 54 will make when carrying out their processes. After the flight phase has been identified, this information is transited to outer-loop guidance control generator 58.

Outer-loop guidance control generator 58 generally produces the commands provided to the aircraft which cause the aircraft to follow its navigation plan. Inputs are received from inertial navigation system 28 and air data sensors 37, in addition to the input from flight phase monitor 56. Outer-loop guidance control generator 58 then provides outputs indicative of the planned aircraft flight path.

The outputs from outer-loop guidance control generator 58 are then provided to first predicted flight path system 52 and second predicted flight path system 54. From these inputs first predicted flight path system 52 can determine the position of the aircraft at the time and predict a flight envelope through which the aircraft is likely to fly in a predetermined period. First predicted flight path envelope, generated by first predicted flight path system 52, is based on the general assumptions that the aircraft will follow its current heading change, attitude change, and attitude during the predetermined interval. This system looks at the present attitude, attitude rates, altitude, altitude rates, heading, flight control mode state, and the mode state of a mission computer 24, to aid in determining if it is likely that the aircraft will perform a maneuver during the predetermined interval. Assuming this maneuver is to be made, the first predicted flight envelope will be created based on that maneuver. The maneuver will be, for example, either (1) pull-up, (2) roll-out and then pull-up, (3) roll-in, roll-out, and pull-up, or (4) vertical speed control. Pull-up will be used if the first predicted flight path is a straight flight path and its vertical angle is less than the recommended maximum vertical flight path. Roll-out and then pull-up will be used if the first predicted flight path is a curved flight path. Roll-in, roll-out and pull-up will be used if flight path re-planning is required. Vertical speed control will be used if the aircraft has vertical take-off capabilities.

Second predicted flight path system 54 operates similarly to produce a second predicted flight envelope through which the aircraft is likely to maneuver. The second predicted flight envelope is based on the inertial navigation status provided by the outer-loop guidance control generator 58 to avoid ground collision. However, second predicted flight path system 54 differs from first predicted flight path system 52 in that it makes different assumptions based on likely aircraft commands. Second predicted flight path system 54 assumes that a reasonable maneuver will be made during the predetermined duration.

The outputs from first predicted flight path system 52 and second predicted flight path system 54 are then provided to aircraft model 39 to assure the predictions are accurate. Aircraft model 39 contains information regarding the maneuverability of the aircraft and assures that certain flight dynamic thresholds can be performed by the aircraft. The predicted flight paths (first and second) are then output to the IGCAS bus 14 for use by other systems.

Figure 10:
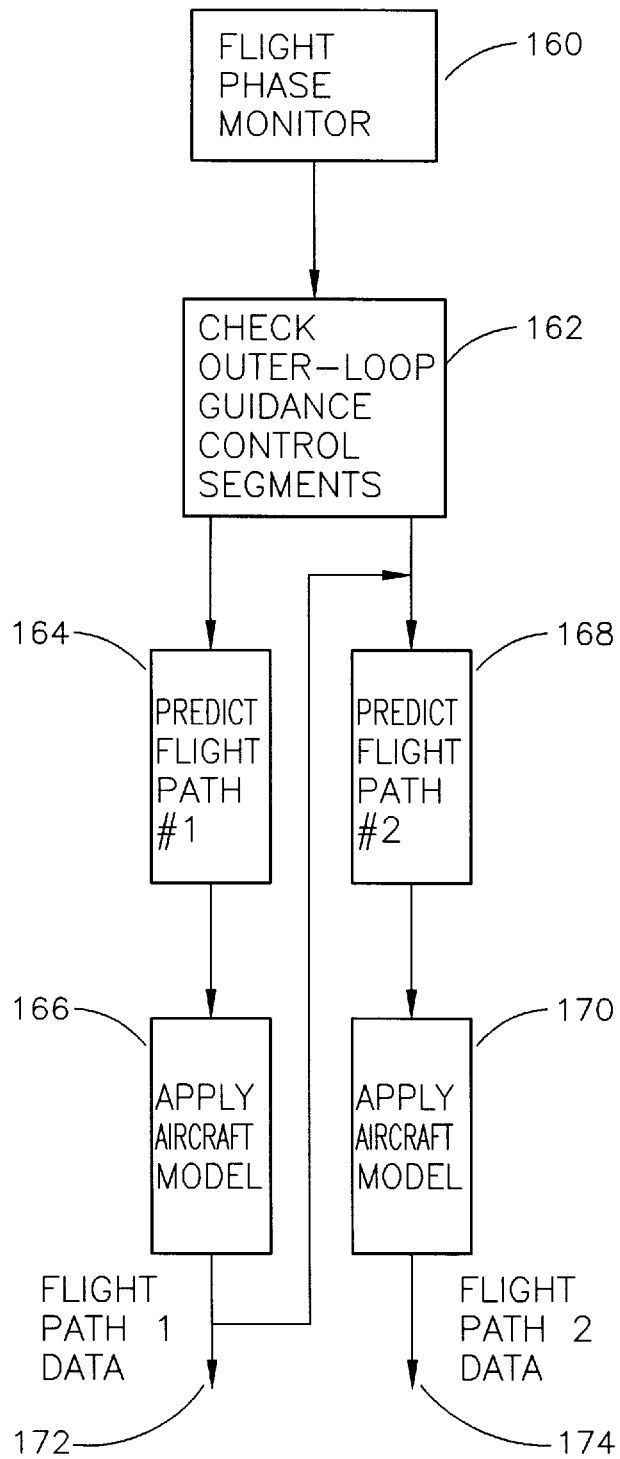
FIG. 10 is logic flow diagram illustrating the logic followed by the flight envelope prediction system.

Referring to FIG. 10, there is shown a logic flow diagram, which is typically used by the flight envelope prediction system 50. The process used for flight envelope prediction begins at block 160 where the flight phase monitor is checked to determine exactly which phase of flight the aircraft is in.

The process then moves on to block 162 where the current outer-loop guidance commands are examined to determine the progress of the aircraft is made with respect to time or maneuvering phase. Also, the upcoming aircraft control segments can be checked to gain some insight regarding the aircraft's position relative to the flight plan. The outer-loop guidance commands for the predicted flight paths are also determined based on this information.

Information related to the aircraft's present maneuver is then processed to predict a first flight path in block 164. In parallel with the prediction of the first predicted flight path, information related to the aircraft's present maneuver is processed to predict a second flight path in block 168. Each of the steps of predicting the first and second flight path are based upon the current flight operation of the aircraft along with a number of predetermined assumptions as discussed above. For example, prediction of the first flight path can be based upon the assumption that the current maneuver/aircraft attitude will be maintained. Alternatively, the second flight path may be predicted based on the assumption that the aircraft is going to return to level flight as soon as possible and start a climb out maneuver. These are two example criterion that can be used in predicting the aircraft flight paths, however it will be understood that many other assumptions can be applicable.

Next, in blocks 166 and 170 the reduced order and high fidelity aircraft model 39 is applied to the predicted flight path to insure the predicted flight paths are realistic. The aircraft model 39 is a simplified model as compared to a full-up linear aircraft model that allows quick and accurate predictions of recommended aircraft flight path with minimum computations required. The aircraft model 39, as previously discussed, contains information regarding the performance limitations of maneuverability of the host aircraft, such as aircraft response times, aircraft dynamic performance characteristics, attitude control limits, and pilot response times (the response times are with respect to operator input to the aircraft dynamics, e.g., there is a delay/response time from the time at which the pilot increases altitude and the time the altitude actually begins to increase). This check of the aircraft model can possibly allow for corrections in the first and second predicted flight paths based upon the aircraft maneuverability. Following the application of the aircraft model the first flight path data 172 and second flight path data 174 are provided to the IGCAS bus 14 for use by other components of the system.

Figure 11:
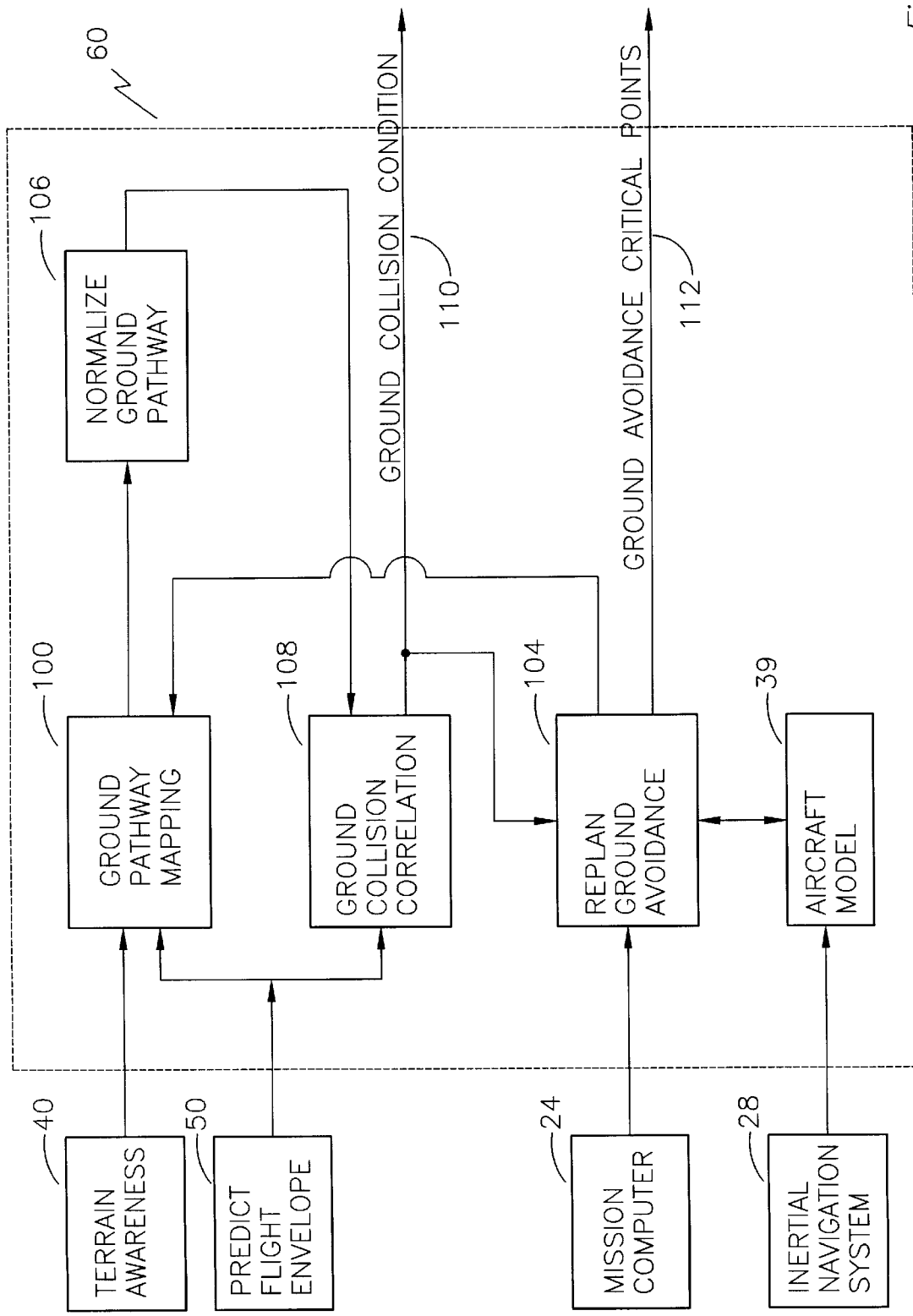
FIG. 11 is block diagram outline the ground correlation and collision condition system.

Referring to FIG. 11, there is shown a block diagram illustrating the ground correlation system 60. Attached to ground correlation system 60 is localized terrain awareness system 40, predicted flight envelope system 50, inertial navigation system 28, and mission computer 24. Contained within the ground correlation system 60 is a ground pathway mapping system 100, a ground collision correlation system 108, a maneuver re-planning system 104, normalized ground pathway system 106, and aircraft model 39.

Ground pathway mapping system 100 receives inputs from the localized terrain awareness system 40, maneuver re-planning system 104, and predicted flight envelope system 50. From these inputs ground pathway mapping system 100 can project the aircraft pathway onto the terrain over which the aircraft is operating. This ground pathway mapping is then transmitted to normalized ground pathway system 106 for normalizing the ground pathway. The normalized ground pathway is a collection of information relating to the terrain and terrain accuracy over which the aircraft is to fly. The normalized ground pathway provides the highest data point for a certain segment of the pathway. Also, some error terms can be added to the ground data to provide a most probable elevation corresponding to the pathway. The normalized ground pathway is then provided to ground collision correlation system 108.

Ground collision correlation system 108 receives an input from flight envelope prediction system 50 along with an input from the aforementioned normalized ground pathway system 106. From these systems, ground collision correlation system 108 determines if, based on the information provided, a ground collision is possible within a predetermined time interval. If such a collision is possible appropriate signals and warnings are provided. This collision condition determination is based upon numerous aforementioned assumptions including: (a) the alternative flight paths determined by flight envelope prediction system 50, and (b) the maneuvering capabilities of the aircraft as provided by aircraft model 39. From all this information the probability of a collision condition can also be determined. The probability of collision can be rated on a scale of "possible provided certain flight dynamics are followed" to "imminent collision if no evasive action is taken." This information can then be provided to further systems to produce the appropriate warnings to the air crew. The results of the ground collision correlation system 108 are then provided to maneuver re-planning system 104 and to IGCAS bus 14 via output 110.

As previously mentioned, ground correlation system 60 also includes maneuver re-planning system 104 which receives signals from mission computer 24, aircraft model 39, and ground collision correlation system 108. Maneuver re-planning system 104 then utilizes these inputs to appropriately re-plan the intermediate flight segments based on the flight information provided by mission computer 24 and collision condition indications as provided by ground collision correlation system 108. The input from aircraft model 39 provides an indication of the possibility of recover and avoidance of collision based upon the maneuverability of the aircraft. Also determined by ground avoidance re-planning system 104 are the critical points at which recovery maneuvers must be undertaken to avoid ground collision. These critical points are then communicated to IGCAS bus 14 via output 112.

Figure 12:
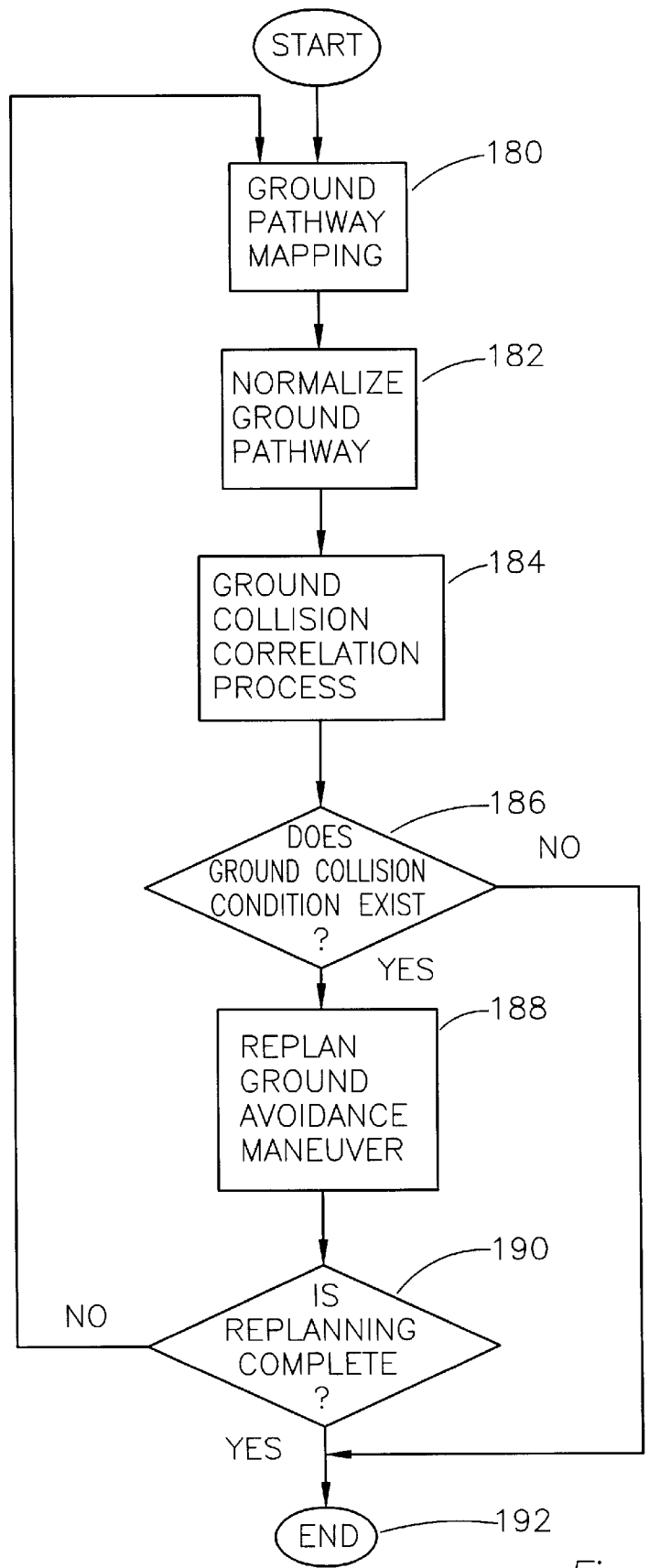
FIG. 12 is a flow diagram outline the logic followed by the ground correlation and collision condition system.
Figure 13:
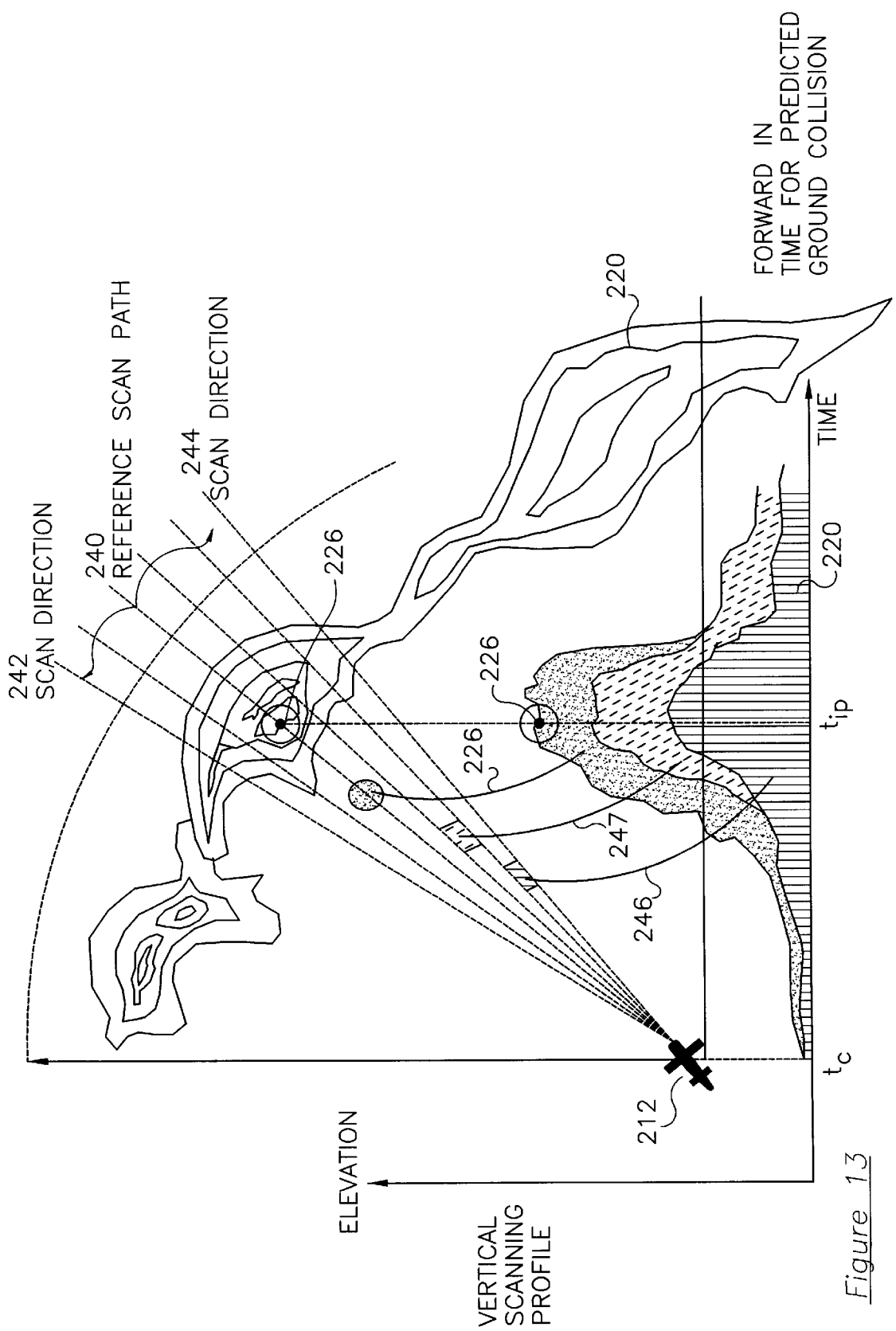
FIG. 13 is a vertical scanning profile (elevation versus time) of an exemplary geographical area illustrating the flight re-planning process.

Referring to FIG. 12, there is shown a more detailed logic flow diagram (of the active flight re-planning procedure once it is determined that a ground collision condition exists) illustrating the logic utilized by ground correlation system 60. The iterative flight re-planning process produced a re-planned active flight path once it is determined that a ground collision situation exists. A flight re-planning condition exists if the current vertical flight path is approximately at or above the recommended vertical flight path or if GAP 228 position necessary to obtain terrain elevation clearance is located behind the current aircraft position (i.e., the aircraft has already passed GAP 228). The process is started and immediately moves to block 180 where the pathway of the aircraft is mapped onto the ground. Referring to FIG. 13, there is shown a vertical scanning profile of the scanning employed to re-plan a flight path and avoid ground collision, i.e., to map the pathway onto the ground. With reference to FIGS. 12 and 13, block 180 uses an open method that scans both the left and right components of the reference scan path 240, i.e., scan directions 242 and 244 in FIG. 13. Scan directions 242 and 244 result in separate ground pathways. Block 180 involves obtaining elevation data corresponding to the terrain over which the aircraft will fly resulting in a ground pathway set of data. The scanning means of block 180 can be implemented in either hardware (e.g., digital scanner circuits) or software (e.g., using a scanning process with DTED 32), which can be operable to provide a multi-directional scan (a dual directional scan has been presented here as a non-limiting example) of the terrain whereby any deviations from the current flight path are minimized.

Next the process moves on to block 182 wherein the ground pathway (as determined by the multi-directional scan) is normalized. More specifically, this process involves determining the highest elevation for some incremental portion of the ground pathway and subsequently designating the normalized elevation for that increment of the pathway as equal to or slightly above that of the highest elevation. Referring to FIG. 13, the highest elevation point in FIG. 13 is designated by reference numeral 226. This normalization also allows the system to include some margin of error into the system by adding a safety margin to the normalized pathway data. Each of the terrain elevation scan segments, for example, 246, 247, and 248 in FIG. 13, are normalized according to block 182. The exemplary scan segments 246, 247, and 248 correspond to the different terrain elevations depicted in FIG. 13 by the three different shading depictions (246, 247, and 248).

In block 184, the ground collision condition correlation is performed. This process involves the correlation of the normalized pathway data and the vertical flight path data (including all projected possible flight paths) to determine if an intersection of this data exists. An intersection will indicate that a collision condition exists and appropriate warnings and flight path re-planning should be undertaken. In block 184, the clearance vertical slope is determined using the highest terrain elevation height and the current aircraft position. In block 186, a decision is made as to whether a collision condition exists. Block 186 is further elaborated upon above with respect to FIGS. 2 through 5. A collision condition exists if the vertical angle is at or above the recommended vertical flight path angle as measured with respect to the horizon; a comparison is made between the current predicted flight path and the recommended flight path necessary to avoid a terrain collision situation. The vertical angle of the re-planning segment is determined by use of DTED 32. If no collision condition exists, then the process is complete and moves on to its end in block 192.

If a collision condition exists, the process moves on to re-plan the flight and produce predicted ground avoidance maneuvers in terms of roll-in, roll-out, and then climb in block 188. In block 188, a new active flight path is established if the re-planned vertical flight path angle is less than the recommended flight path angle (i.e., the minimum clearance altitude is satisfied for the vertical scanning profile). In block 190, if flight path re-planning has been done but is not complete in the sense that the system is not yet confident that no collision will occur, the process then reverts back to block 180 to reinitiate the ground correlation process for the newly re-planned flight path. However, if the re-planning has been rechecked by the system, the process moves on to its end at block 192.

Figure 14:
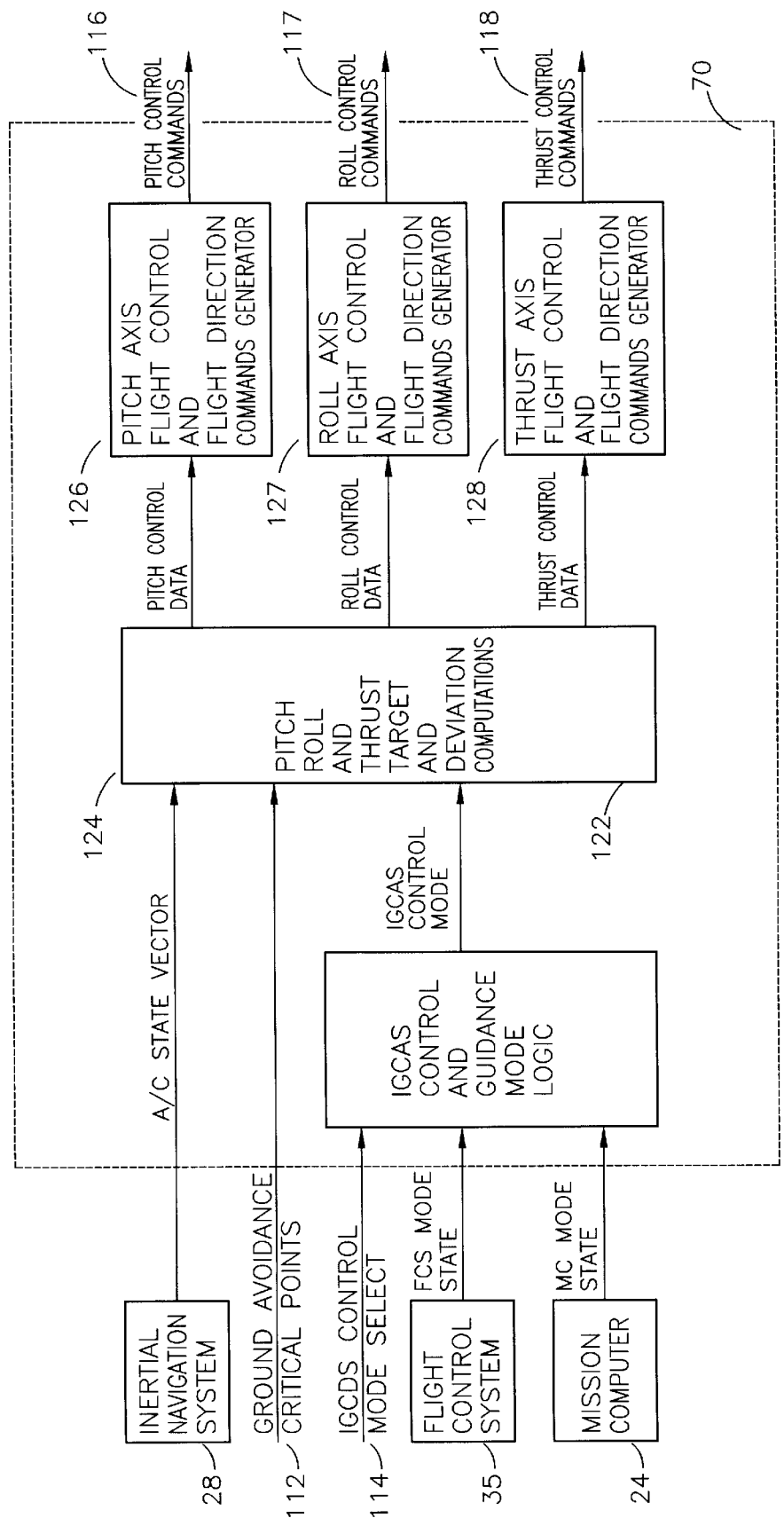
FIG. 14 is a block diagram outlining the avoidance control and guidance system of the present invention.

Referring to FIG. 14, there is shown avoidance control and guidance system 70. As shown in FIG. 14, there is shown avoidance control and guidance system 70 receives the ground avoidance critical point input 112 from ground correlation system 60, IGCAS control mode select input 114 from IGCAS controller 90, an aircraft state vector input from inertial navigation system 28, a flight control mode state input from flight control system 35, and a mission computer mode state input from mission computer 24. All of these inputs are utilized to provide appropriate guidance control commands to avoid possible ground collision. Contained within avoidance control and guidance system 70, is IGCAS control and guidance mode logic 122, a pitch, roll and thrust target and deviation generator 124, pitch axis control and command generator 126, roll axis control and command generator 127, and a thrust axis control and command generator 128.

The first signals received by avoidance control and guidance system 70 are the flight control system mode state signal from flight control system 35, the IGCAS control mode select input 114 from IGCAS controller 90 and the mission computer state signal from mission computer 24. From these signals, IGCAS control and guidance mode logic 122 determines how much control the IGCAS system has. For example, the system can be configured such that the full control of flight activities is handled by the IGCAS system or only flight director command cues are provided to the pilots. Alternatively, the system can be configured to provide warnings and displays to alert the pilot about collision conditions and advise the pilots on avoidance maneuvers. The status of IGCAS control is communicated as an IGCAS control mode signal to a pitch, roll and thrust target and deviation generator 124 to allow it to produce appropriate control signal commands.

Pitch, roll and thrust target and deviation generator 124 receives the IGCAS control mode signal along with the aircraft state vector from inertial guidance system 28 and the ground avoidance critical points signal 112. Ground avoidance critical points signal 112 are made up of the locations at which some type of evasive action must be taken. Collision avoidance control generator 124 receives these commands and determines the appropriate type of flight required to evade the possible collision with the ground. This evasive flight path or evasive maneuver as determined by collision avoidance control generator 124 is then provided to pitch axis control generator 126, roll axis control generator 127 and thrust control generator 128. Each of these systems (pitch axis control generator 126, roll axis control generator 127 and thrust control generator 128) provides the appropriate settings and commands to perform the desired evasive maneuver. Pitch axis control generator 126 and roll axis control generator 127 provides the appropriate pitch and roll commands (pitch control commands 116 and roll control commands 117, respectively) to perform and cue the aforementioned evasive maneuver while thrust control generator 128 determines the appropriate thrust settings to accomplish the desired maneuver and communicates that information via thrust control commands 118. These signals are then transmitted to the IGCAS flight control computer 135 and appropriate guidance systems via the IGCAS bus 14 and avionics bus 20.

Figure 15:
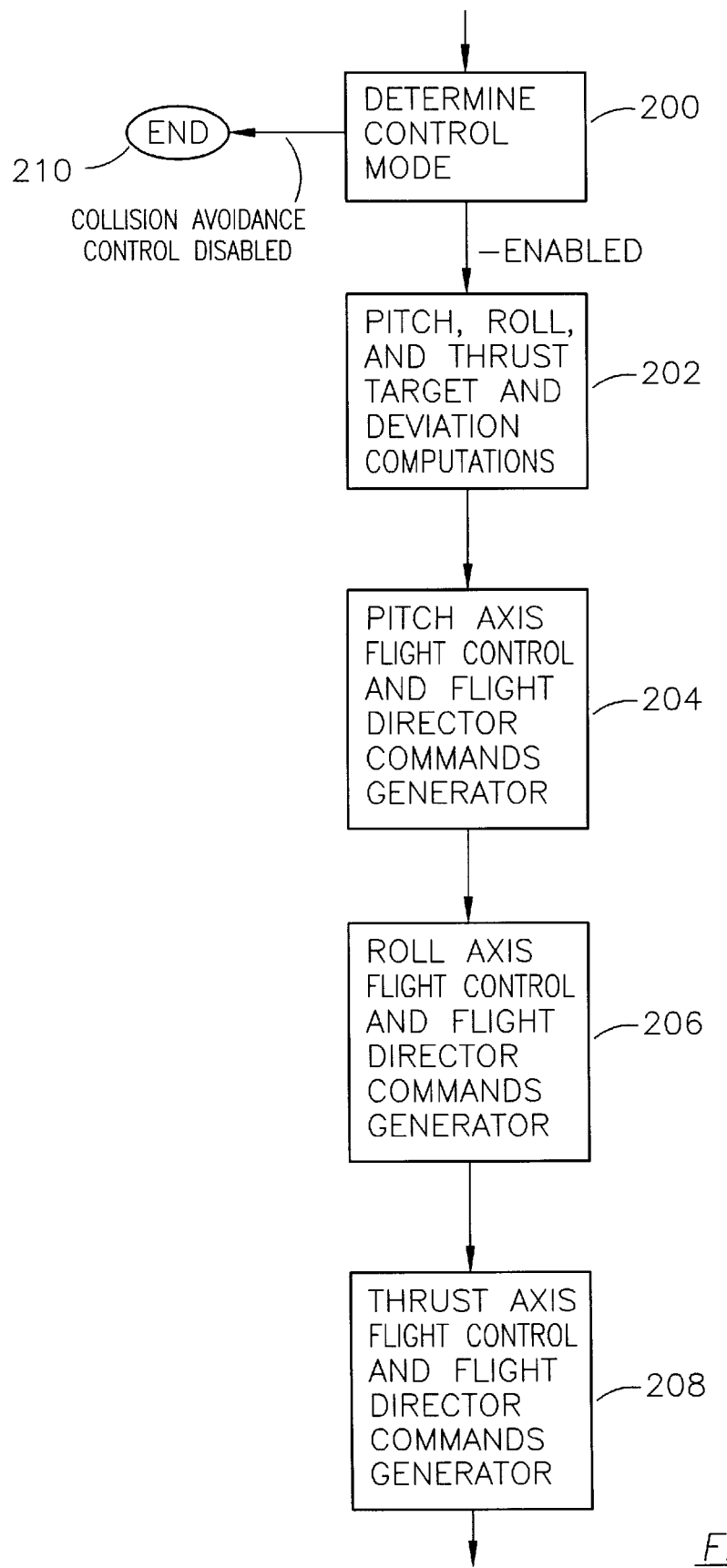
FIG. 15 is a logic flow diagram outlining the logic followed by the avoidance control and guidance system.

Referring to FIG. 15, there is shown a logic flow diagram that illustrates the logic used by avoidance control and guidance system 70 to produce flight control commands which will avoid ground collision. In block 200 the process begins by determining the control mode under which the system is operating. If the IGCAS system is not coupled with the flight control computer, then the process will not generate flight control command. If the system is enabled, then the process moves to block 202 wherein the pitch, roll, and thrust targets and deviations are computed. This is done with information from predicted avoidance path and the inertial navigation 28. Following the computation of targets and deviations, this information can be used to generate the actual flight director commands to cue the pilot, and the flight control actuator commands to cause the aircraft to undergo evasive maneuvers. The pitch axis targets and deviations are utilized in block 204 to generate pitch axis flight director and flight control commands. Similarly, the roll axis targets and deviations are utilized in block 206 to generate roll axis flight director and flight commands. Lastly, the thrust targets and deviations are utilized in block 208 to generate thrust axis flight director and thrust control commands.

Other variations and modifications of the present invention will be apparent to those of skill in the art, and it is the intent of the appended claims that such variations and modifications be covered. The particular values and configurations discussed above can be varied and are cited merely to illustrate a particular embodiment of the present invention and are not intended to limit the scope of the invention. It is contemplated that the use of the present invention can involve components having different characteristics as long as the principles of the invention are followed.

Having illustrated and described the principles of the invention in the preferred embodiment it should be apparent to those skilled in the art that the invention can be modified in arrangement and detail without departing from such principles. We claim all modifications coming within the scope and spirit of the following claims.

What is claimed is:

1. A ground collision avoidance system for use by a pilot in an aircraft that has a mission control system, a navigation system, a digital terrain elevation database, active terrain sensors and a radar altimeter, the ground collision avoidance system comprising:

a local terrain awareness system that fuses inputs from the mission control system, the navigation system, the active terrain sensors, and the radar altimeter with terrain information in the digital terrain elevation database to generate a current profile of the elevation and character of the terrain over which the aircraft is operating;

a flight envelope prediction system attached to the mission control system for providing first and second flight path envelopes, wherein the first flight path envelope is a first prediction of the aircraft's flight path based on a current flight path and the second flight path envelope is a second prediction of the aircraft's flight path based on the first path envelope and a flight path angle that is necessary to avoid the terrain which may exist in the first path envelope, the second flight path envelope being determined by iteratively and simultaneously determining a ground collision point and a ground avoidance point, the ground collision point being a predicted point of collision with the terrain and the ground avoidance point being a predicted point with respect to the ground collision point at which the aircraft's path should be modified to avoid the terrain;

a ground correlation system attached to the local terrain awareness system and the flight envelope prediction system for correlating terrain elevation data with the first and second flight path envelopes for providing pathway elevation data indicative of specific ground elevation data over which the aircraft travels;

a collision control and guidance system attached to the ground correlation system and the flight envelope prediction system which determines that a ground collision condition exists when the generation of the second flight path envelope by the flight envelope prediction system is no longer possible, and then uses the terrain information to calculate at least one standard replanning maneuver to avoid collision with the terrain; and a collision warning system attached to the collision control and guidance system for producing an alarm if the ground collision condition exists as determined by the collision control and guidance system.

2. The ground collision system of claim 1 wherein the alarm is indicative of the response required of the pilot to avoid the ground avoidance point or an imminent ground collision condition.

3. The ground collision system of claim 1 further comprising a display system attached to the collision warning system for providing a visual depiction of the ground collision point and the ground avoidance point along with guidance controls to the pilot of the aircraft.

4. The ground collision system of claim 3 wherein, in response to the alarm produced by the collision warning system, the collision control and guidance system determines a calculated evasive maneuver which, if carried out, will avoid the ground collision condition.

5. The ground collision system of claim 4 wherein the calculated evasive maneuver includes a pitch control command, a roll control command and a thrust control command.

6. The ground collision system of claim 1 further comprising an aircraft dynamics model indicative of the operating dynamics of the aircraft, the aircraft dynamics model accessible by the flight prediction envelope system, the collision control and guidance system, and the collision warning system.

7. The ground collision system of claim 6 wherein the aircraft dynamics model includes a plurality of information regarding pilot and aircraft dynamic performance characteristics to accurately predict possible maneuvering capabilities of the aircraft.

8. The ground collision system of claim 2, wherein the warning buzzer is a variable frequency and distinctive voice advisory and warning for various ground collision and ground avoidance situations.

9. The ground collision system of claim 6, wherein the aircraft dynamics model is a reduced order and high fidelity model.

10. The ground collision system of claim 1 further comprising means for continuously monitoring the location of the ground avoidance point in response to the aircraft following the recommended flight path.

11. The ground collision system of claim 1, further comprising scanning means, in communication with said ground correlation system, for calculating the at least one standard replanning maneuver, said scanning means operable to provide a multi-directional scan of the terrain whereby any deviations from the current flight path are minimized.

12. The ground collision system of claim 1, further comprising means, cooperating with the ground correlation system, for advising the pilot when the ground collision condition no longer exists.

13. The ground collision system of claim 1, further comprising display means, communicating with said flight envelope prediction system, for displaying the second flight path envelope to the pilot.

14. The ground collision system of claim 1, wherein the ground collision point is determined by a minimum clearance altitude delta, the minimum clearance altitude delta being a minimum acceptable distance between the ground impact point and the current flight path that will allow the aircraft to avoid collision with the terrain.

15. The ground collision system of claim 1, wherein the ground collision point is determined by calculating forward in time a plurality of instantaneous positions and an inertial vector status with respect to the digital terrain elevation database.

16. A method for avoiding collision between an aircraft and the ground, the aircraft having a mission control system, an inertial navigation system, a digital terrain elevation database, active terrain sensors and a radar altimeter, the method comprising the steps of:

determining the aircraft altitude and a first predicted flight envelope where the first predicted flight envelope is the aircraft's current flight path;

generating a vertical profile which includes terrain elevations over which the aircraft is currently positioned, and the terrain elevations corresponding to the terrain over which the first predicted flight envelope passes, where the terrain elevations are generated from a fusion of the digital terrain elevation database and inputs from the active terrain sensors, the inertial navigation system, and the radar altimeter;

continually determining a second predicted flight envelope, where the second predicted flight path is a recommended flight path that is based on the first predicted flight envelope and a flight path angle, in which the aircraft travels out of the first predicted flight envelope to avoid any collisions with the terrain, the second predicted flight envelope being determined by iteratively and simultaneously locating a ground collision point and a ground avoidance point, the ground collision point being a predicted point of collision with the terrain and the ground avoidance point being a Predicted point with respect to the ground collision point at which the pilot should follow the recommended flight path to avoid the terrain;

determining that a collision condition exists when the aircraft is traveling within the first predicted flight envelope and exceeds the second predicted flight envelope;

warning the pilot when the collision condition exists and accessing the digital terrain elevation database to generate at least one evasive maneuver which will avoid the collision condition; and presenting the at least one evasive maneuver to the pilot via a display means.

17. The method of claim 16 wherein the vertical profile comprises a plurality of phase of flight information, the phase of flight information being indicative of a certain phase of flight of the aircraft at any particular point in time, and the step of determining that a collision condition exists includes consideration of the phase of flight in which the aircraft is currently operating.

18. The ground collision system of claim 16 further comprising the step of providing a flight envelope prediction system and a flight phase monitor apparatus, the flight phase monitor apparatus being adapted to monitor a plurality of phase of flight information, the phase of flight information being indicative of a certain phase of flight of the aircraft at any particular point in time, the flight phase monitor apparatus being adapted to provide the phase of flight information to the flight envelope prediction system.

19. The method of claim 16 further comprising the step of providing scanning means operable to provide a multi-directional scan of the terrain whereby any deviations from the current flight path are minimized.

20. The method of claim 16 further comprising the step of continuously monitoring the ground avoidance point at any particular point in time for determining the second predicted flight envelope.

21. The method of claim 20, further comprising the steps of capturing a plurality of complete simulated aircraft inertial states, and of storing the plurality of complete simulated aircraft inertial states for use in said step of continually determining a second predicted flight envelope.

22. The method of claim 16 further comprising the step of continuously monitoring the mission control system for avoiding nuisance warnings related to deliberate ground approach conditions.

* * * * *